(12) United States Patent
Morinaga et al.

(10) Patent No.: US 7,702,804 B2
(45) Date of Patent: Apr. 20, 2010

(54) COMMUNICATION RELAY METHOD, COMMUNICATION RELAY DEVICE, COMMUNICATION RELAY PROGRAM AND COMPUTER-READABLE RECORDING MEDIUM STORING COMMUNICATION RELAY PROGRAM

(75) Inventors: Masanobu Morinaga, Kawasaki (JP); Hideaki Miyazaki, Kawasaki (JP); Hitoshi Yamauchi, Kawasaki (JP); Noriyuki Fukuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1425 days.

(21) Appl. No.: 10/737,803

(22) Filed: Dec. 18, 2003

(65) Prior Publication Data

US 2004/0158645 A1 Aug. 12, 2004

(30) Foreign Application Priority Data

Jan. 29, 2003 (JP) .............................. 2003-021072

(51) Int. Cl.
 *G06F 15/16* (2006.01)
 *G06F 15/173* (2006.01)
 *G06F 17/00* (2006.01)

(52) U.S. Cl. ...................... 709/230; 709/238; 709/246; 463/42

(58) Field of Classification Search ........................ None
 See application file for complete search history.

(56) References Cited

U.S. PATENT DOCUMENTS

| | | | |
|---|---|---|---|
| 6,379,251 B1 * | 4/2002 | Auxier et al. ................ | 463/42 |
| 6,459,682 B1 * | 10/2002 | Ellesson et al. .............. | 370/235 |
| 6,957,190 B1 * | 10/2005 | Sakayori et al. .............. | 705/16 |
| 7,143,169 B1 * | 11/2006 | Champagne et al. ........ | 709/226 |
| 7,194,761 B1 * | 3/2007 | Champagne .................... | 726/6 |
| 7,290,057 B2 * | 10/2007 | Saunders et al. ............. | 709/231 |
| 7,313,596 B2 | 12/2007 | Tani et al. | |
| 2002/0169833 A1 | 11/2002 | Tani et al. | |
| 2003/0023598 A1 * | 1/2003 | Janakiraman et al. ........ | 707/10 |
| 2003/0074413 A1 * | 4/2003 | Nielsen et al. .............. | 709/206 |
| 2003/0106070 A1 * | 6/2003 | Saam ......................... | 725/135 |
| 2004/0213204 A1 * | 10/2004 | Yang ......................... | 370/352 |

FOREIGN PATENT DOCUMENTS

| | | | |
|---|---|---|---|
| JP | 2001-266005 | | 9/2001 |
| JP | 2002-222368 | | 8/2002 |
| JP | 2001-047171 | * | 9/2002 |
| JP | 2002-252841 | | 9/2002 |
| WO | WO 99/20049 | | 4/1999 |

* cited by examiner

*Primary Examiner*—Wen-Tai Lin

(57) ABSTRACT

A communication relay device adds information to communication data without depending on a communication application of a communication terminal. The relay device (1) includes a relay control portion (13), a control information database (14), an adder portion (15) and a database for addition (16). The relay control portion (13) controls the adder portion (15) in accordance with information accumulated in the control information DB 14. The adder portion (15) adds the additional data accumulated in the database for addition (16) to decoded first contents in accordance with a control instruction by the relay control portion (13).

13 Claims, 11 Drawing Sheets

| | |
|---|---|
| method of adding | 01 |
| height of a start point Y (pixel) | 10 |
| width of a start point X (pixel) | 10 |
| height of a display H (pixel) | 32 |
| width of a display W (pixel) | 320 |
| speed of a character display V (pixels/sec) | 20 |
| frequency of a moving image display F (frames/sec) | 10 |

| attribution value | content |
|---|---|
| 00 | no addition |
| 01 | insertion of a character string |
| 02 | insertion of a static image |
| 03 | insertion of a moving image |

```
             first INVITE message

INVITE sip:UserB@ss1.xxx.com SIP/2.0
Via: SIP/2.0/UDP aaa.com:5060
From: ME <sip:UserA@aaa.com>
To: YOU <sip:UserB@bbb.com>
Call-ID: 123456@aaa.com
CSeq: 1 INVITE
Contact: ME <sip:UserA@aaa.com>
Content-Type: application/sdp
Content-Length: 132 v=0
o=UserA 9876543210 9876543210 IN IP4 aaa.com
s=Session SDP
c=IN IP4 10.101.102.103
t=0 0
m=audio 80000 RTP/AVP 0
a=rtpmap:0 PCMU/8000 m=video 90000 RTP/AVP 31
``` third INVITE message

```
INVITE sip:UserB@bbb.com SIP/2.0
Via: SIP/2.0/UDP ss2.xxx.com:5060
Via: SIP/2.0/UDP ss1.xxx.com:5060
Via: SIP/2.0/UDP aaa.com:5060
From: ME <sip:UserA@aaa.com>
To: YOU <sip:UserB@bbb.com>
Call-ID: 123456@aaa.com
CSeq: 1 INVITE
Contact: ME <sip:UserA@aaa.com>
Content-Type: application/sdp
Content-Length: 132 v=0
o=UserA 9876543210 9876543210 IN IP4 aaa.com
s=Session SDP
c=IN IP4 10.101.102.103
t=0 0
m=audio 80000 RTP/AVP 0
a=rtpmap:0 PCMU/8000
m=video 90000 RTP/AVP 31
```

*Fig. 10*

COMMUNICATION RELAY METHOD, COMMUNICATION RELAY DEVICE, COMMUNICATION RELAY PROGRAM AND COMPUTER-READABLE RECORDING MEDIUM STORING COMMUNICATION RELAY PROGRAM

BACKGROUND OF THE INVENTION

1. Field of the Invention

The present invention relates to a relay for communication.

2. Description of the Prior Art

Provision of contents via the Internet has been spread widely as the Internet has become commonplace recently. Accompanying with this provision of contents, predetermined information is provided. For example, Japanese unexamined patent publication No. 2001-266005 discloses a technique for display a banner advertisement accompanying a Web site in predetermined area on the screen. Using this technique, advertisement can be performed with the provision of contents to users.

Furthermore, Japanese unexamined patent publication 2001-520491 of a PCT application discloses a technique regarding a device for obtaining a multimedia object from a packet that contains data for bidirectional communication such as speech communication without limiting to one-way communication such as a Web site and for displaying the same. For instance, if a communication application that is used by a speaker on the Internet telephone has this device, it is possible to display a graphic such as a banner advertisement on the computer display during the speech communication on the Internet telephone.

However, in order to display a multimedia object during the bidirectional communication as explained above, it is necessary to install the device disclosed in the above-mentioned second patent publication in the communication application that is used for the bidirectional communication. In this case, since communicators usually use different communication applications depending on communication carrier venders, the above-mentioned device has to be customized to the communication application. Therefore, it is difficult for a third party except for the communication carrier vender to add information such as a multimedia object to a communication packet such as the Internet telephone and to perform an advertisement service.

SUMMARY OF THE INVENTION

An object of the present invention is to provide a communication relay method and device for adding information to communication data in a communication terminal without depending on a communication application.

According to a first aspect of the present invention, a communication relay method is provided, which is performed by a relay device that relays communication between two computers. The method includes the steps of establishing connection with the two computers, receiving first contents transmitted from one of the two computers to the other as a payload, accumulating first additional data to be added to the first contents, and transmitting second contents containing the first contents and the first additional data as a payload to the computer that is a destination of the first contents. The first contents to be received in the receiving step contain image data and/or audio data.

Since the second contents containing the first contents and the first additional data are generated as a payload, the first additional data can be delivered to the computer that is a destination without depending on a communication application of the computer that is a destination.

According to a second aspect of the present invention, the communication relay method according to the first aspect further includes the step of combining the first contents with the first additional data so as to generate the second contents if each of the first contents and the first additional data contain image data and/or text data.

By this structure, the first contents can be combined with the first additional data without inconsistency, which can be supplied to the computer that is a destination.

According to a third aspect of the present invention, in the communication relay method according to the second aspect, the accumulating step includes further accumulation of output control data for designating a display area of the first additional data, and the combining step includes combining the first contents with the first additional data in accordance with the output control data.

By this structure, the first contents are combined with the first additional data in accordance with the output control data for designating a display area of the first additional data in the first contents. Therefore, the first additional data can be displayed at a desired area in the first contents.

According to a fourth aspect of the present invention, in the communication relay method according to the second aspect, the accumulating step includes further accumulation of output control data for designating a speed of scrolling the first additional data if the first additional data contain text data, and the combining step includes combining the first contents with the first additional data in accordance with the output control data.

By this structure, a scroll speed of e.g., a telop character string of a news flash that is combined with the first contents can be adjusted.

According to a fifth aspect of the present invention, in the communication relay method according to the second aspect, the accumulating step includes further accumulation of output control data for designating an output frequency of the first additional data if the first additional data contain moving image data, and the combining step includes combining the first contents with the first additional data in accordance with the output control data.

By this structure, a display speed of an animation that is combined with the first contents to be displayed can be adjusted.

According to a sixth aspect of the present invention, the communication relay method according to the first aspect further includes the step of mixing the first contents with the first additional data so as to generate mixing data if each of the first contents and the first additional data contain audio data, wherein the transmitting step includes transmitting the mixing data.

By this structure, an announce voice or a BGM for example can be mixed with a speech communication voice, which can be reproduced in the computer that is a destination.

According to a seventh aspect of the present invention, in the communication relay method according to the sixth aspect, the accumulating step includes further accumulation of output control data for designating an output sound level of the first additional data, and the mixing step includes mixing the first contents with the first additional data in accordance with the output control data.

By this structure, a sound level of an announce voice or a BGM that is mixed with a speech communication voice can be adjusted so that it can be heard without interfering the speech communication.

According to a eighth aspect of the present invention, the communication relay method according to the first aspect further includes the step of adjusting quality of image data and/or audio data contained in the first contents, wherein the transmitting step includes transmitting the first additional data and first contents after adjusted in the quality adjusting step.

By this structure, a process such as a contrast adjustment, an edge emphasizing, or a sepia filter process can be performed on the image data contained in the first contents, for instance. In addition, if the image data or the audio data contained in the first contents have a packet loss, an image compensation or a sound compensation can be performed.

According to a ninth aspect of the present invention, a communication relay device for relaying communication between two computers is provided. The device includes unit for establishing connection with the two computers, unit for receiving first contents transmitted from one of the two computers to the other as a payload, unit for accumulating first additional data to be added to the first contents, and unit for transmitting second contents containing the first contents and the first additional data as a payload to the computer that is a destination of the first contents. The first contents to be received by the receiving unit contain image data and/or audio data.

According to a tenth aspect of the present invention, a communication relay program is provided, which is executed by a relay device for relaying communication between two computers. The program functionalizes the relay device as unit for establishing connection with the two computers, unit for receiving first contents transmitted from one of the two computers to the other as a payload, unit for accumulating first additional data to be added to the first contents, and unit for transmitting second contents containing the first contents and the first additional data as a payload to the computer that is a destination of the first contents. The first contents to be received by the receiving unit contain image data and/or audio data.

According to an eleventh aspect of the present invention, a computer-readable recording medium storing a communication relay program is provided, which is executed by a relay device for relaying communication between two computers. The program functionalizes the relay device as unit for establishing connection with the two computers, unit for receiving first contents transmitted from one of the two computers to the other as a payload, unit for accumulating first additional data to be added to the first contents, and unit for transmitting second contents containing the first contents and the first additional data as a payload to the computer that is a destination of the first contents. The first contents to be received by the receiving unit contain image data and/or audio data.

The recording medium storing a program for performing the above-mentioned method of the present invention is in the scope of the present invention. The recording medium can be a flexible disk, a hard disk, a semiconductor memory, a CD-ROM, a DVD, an MO, or others that can be read and written by a computer.

According to a twelfth aspect of the present invention, a communication relay method is provided, which is performed by a relay device that relays communication between two computers. The method includes the steps of establishing connection with the two computers, receiving second contents containing first contents transmitted from one of the two computers to the other and first additional data added to the first contents by the other relay device as a payload, accumulating second additional data to be added to the first contents, reconstructing the first contents by removing the first additional data from the second contents, and transmitting third contents containing the first contents obtained in the reconstructing step and the second additional data as a payload to the computer that is a destination of the first contents.

By this structure, it is prevented that unnecessary additional data are added to the first contents. Furthermore, it is prevented that additional data are added to the first contents in an overlapping manner.

According to a thirteenth aspect of the present invention, a communication relay method is provided, which is performed by a relay device that relays communication between two computers. The method includes the steps of establishing connection with the two computers, receiving first contents transmitted from one of the two computers to the other as a payload, accumulating first additional data to be added to the first contents, deciding whether or not second additional data that was added to the first contents by a relay device except the relay device are contained in the reception data, and transmitting third contents containing the first contents and the second additional data as a payload to the computer that is a destination of the first contents if the reception data contain the second additional data, while transmitting second contents containing the first contents and the first additional data as a payload to the computer that is a destination of the first contents if the reception data does not contain the second additional data. The first contents to be received in the receiving step contain image data and/or audio data.

By this structure, if the second additional data are added to the first contents by another relay device, the first contents can be transmitted to the computer that is a destination without adding the first additional data. Otherwise, if the second additional data are not added to the first contents by another relay device, the first additional data can be added to the first contents, which are transmitted to the computer that is a destination.

BRIEF DESCRIPTION OF THE DRAWINGS

FIG. 3 is a conceptual explanatory diagram of information to be accumulated in a control information table.

FIG. 5 is a conceptual explanatory diagram of information to be accumulated in an attribution table.

FIG. 10 shows an example of a third INVITE message.

DESCRIPTION OF THE PREFERRED EMBODIMENTS

Hereinafter, the present invention will be explained more in detail with reference to embodiments and drawings.

First Embodiment

(1) Structure

Figure 1:
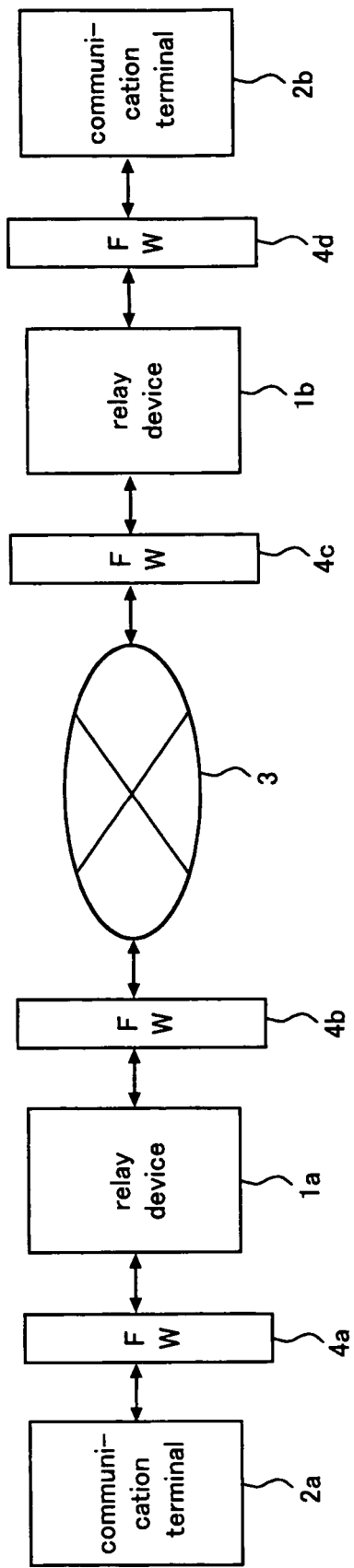
FIG. 1 shows a structure of the entire communication system according to a first embodiment.

FIG. 1 shows a structure of the entire communication system to which a communication relay method according to a first embodiment of the present invention is applied. This system includes a communication terminal 2a and a communication terminal 2b, which are connected to each other via relay devices 1a and 1b and a network 3 such as the Internet.

The communication terminal 2a performs a bidirectional communication such as an IP telephone with the communication terminal 2b. The communication terminals 2a and 2b are respectively connected to the relay devices 1a and 1b via a public telephone line, LAN (not shown), or the like. The relay devices 1a and 1b are disposed between inner fire walls 4a and 4d and outer fire walls 4b and 4c, so as to ensure security of the relay devices 1a and 1b and the communication terminals 2a and 2b. The fire walls 4a-4d can be constituted by using well-known fire wall servers (not shown) or others. Hereinafter, unless it is particularly mentioned, the relay device 1b, the communication terminal 2b and the fire wall 4b-4d have structures and functions similar to the relay device 1a, the communication terminal 2a and the fire wall 4a, respectively, for representing them by the relay device 1, the communication terminal 2 and the fire wall 4. Furthermore, the present invention can be applied to a structure without a fire wall.

Figure 2:
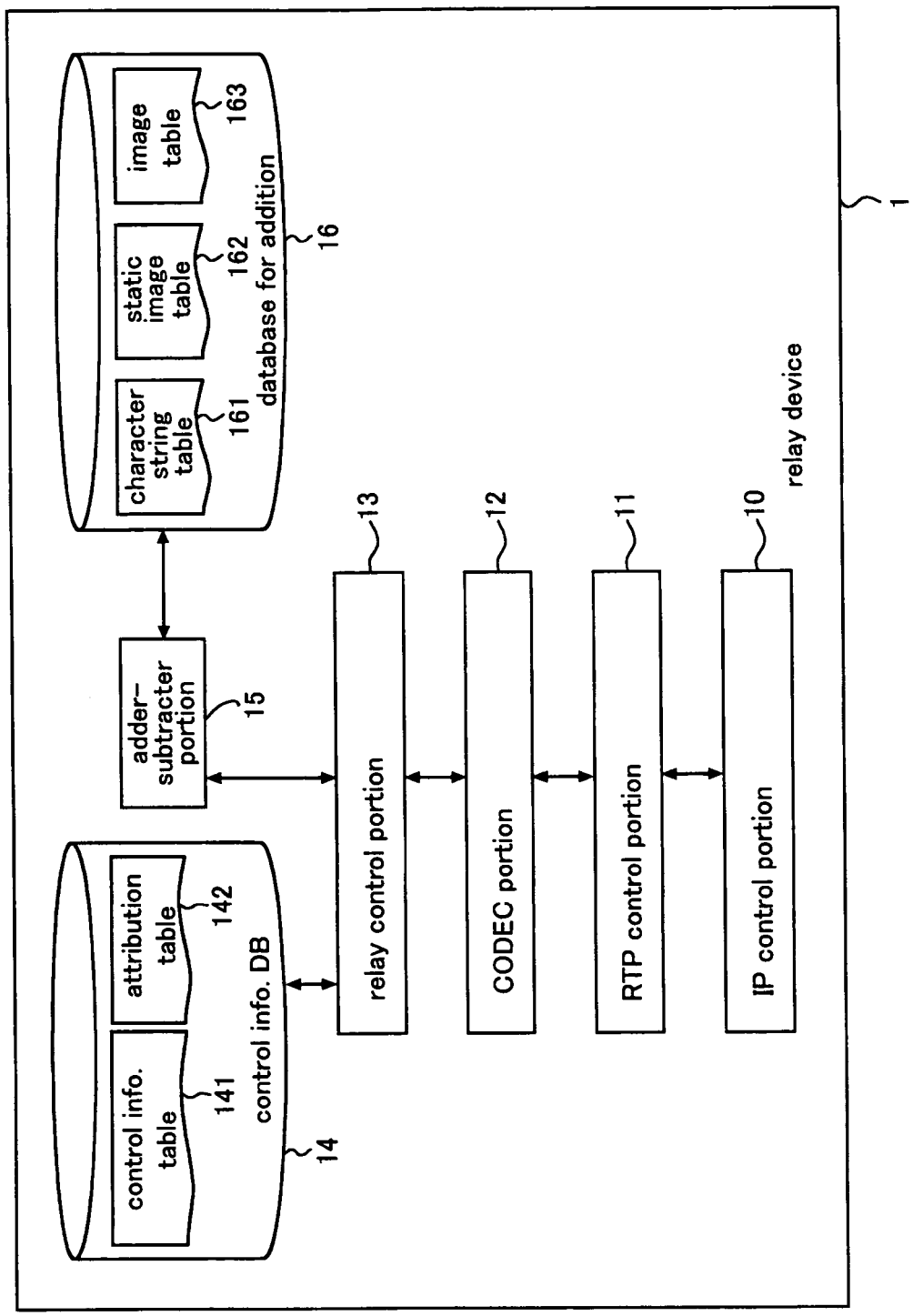
FIG. 2 shows a detailed structure of a relay device.

The relay device 1 relays data communication between the communication terminal 2a and the communication terminal 2b. FIG. 2 shows a detailed structure of the relay device 1. In order to simplify the description, an example is adopted where the network 3 conforms to the TCP/IP protocol, and a communication protocol that the relay device 1 relays is RTP (Real Time Protocol). The relay device 1 includes an IP control portion 10, an RTP control portion 11, a CODEC portion 12, a relay control portion 13, a control information database (DB) 14, an adder-subtracter portion 15 and a database (DB) for addition 16. The IP control portion 10 receives an RTP packet transmitted from the communication terminal 2 and transfers the same to the RTP control portion 11. The RTP control portion 11 obtains a payload that describes compressed contents (hereinafter referred to as first contents) from the RTP packet and transfers the same to the CODEC portion 12. The first contents can be speech communication audio data described in a u-law format or others, moving image data described in MPEG4 format or others, still image data described in JPEG format, or others. The CODEC portion 12 expands and decodes the compressed first contents and transfers the decoded first contents to the relay control portion 13.

The relay control portion 13 controls the adder-subtracter portion 15 in accordance with information accumulated in a control information DB 14 that will be explained later. The adder-subtracter portion 15 add the additional data accumulated in the database for addition 16 to the decoded first contents in accordance with a control instruction by the relay control portion 13. It is preferable that the adder-subtracter portion 15 embeds the additional data in the first contents so as to combine them. On the contrary, it is possible that the adder-subtracter portion 15 deletes the additional data from the contents containing the additional data added by another relay device 1 in accordance with a control instruction by the relay control portion 13 so as to reconstruct the first contents to be transmitted and received. In addition, the adder-subtracter portion 15 may further add additional data to the contents containing the additional data added by another relay device 1 in accordance with a control instruction by the relay control portion 13. The relay control portion 13 transfers the second contents obtained by adding the additional data to the first contents to the CODEC portion 12. The CODEC portion 12 compresses and encodes the second contents, are transferred to the RTP control portion 11. The RTP control portion 11 converts the compressed second contents into the RTP packet as a payload and transfers the same to the IP control portion 10. The IP control portion 10 transmits the communication data containing the RTP packet to the communication terminal 2.

The control information DB 14 includes a control information table 141 and an attribution table 142. The control information is information for indicating how to add the additional data to the first contents. For instance, if the first contents and the additional data are image data or text data, the control information can be as follows.

a) Data for designating an area in which the additional data are embedded b) Data for designating a scroll speed of text data c) Data for designating an output frequency of a moving image The data a) can be data for designating a position and a size of an area where the additional data are displayed by pixels. The data b) can be data for designating a moving speed of a text by pixels/sec, i.e., the number of moving pixels per second. The data c) can be data for designating a frequency of displaying a moving image by frames/sec, i.e., the number of displayed frames per second.

Furthermore, if the first contents and the additional data are audio data for instance, the control information can be data like below.

d) Data for designating a sound level of the additional data e) Data for designating a sound level of a mixed sound of the first contents and the additional data In the following explanation, it is supposed that the first contents that are static image data or moving image data are combined with the additional data that are character string data, static image data or moving image data.

Figure 4:
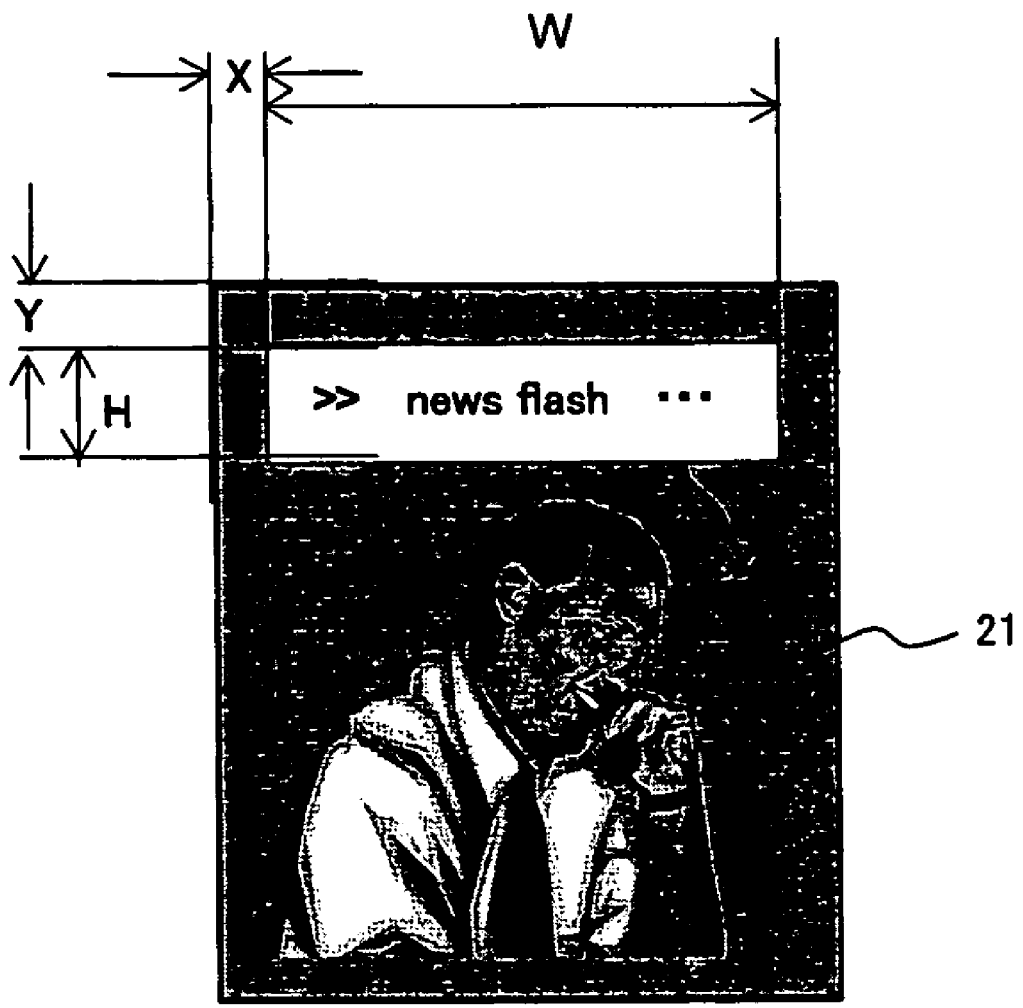
FIG. 4 shows an example of a display of second contents.

FIG. 3 shows an example of control information for designating an area where the additional data are embedded. The control information table 141 includes as fields an advertisement combining method, a height of a start point Y (pixel), a width of the start point X (pixel), a height of a display H (pixel), a width W of the display (pixel), the speed of a character display V (pixels/sec) and the frequency of the moving image display F (frames/sec). The field "method of adding" is for accumulating an attribution value for deciding whether or not additional data are added to the first contents by the adder-subtracter portion 15 and for discriminating a type of the additional data. The relationship between the method of adding and the attribution value is accumulated in the attribution table 142, which will be explained later. The height of a start point Y (pixel), the width of a start point X (pixel), the height of a display H (pixel) and the width of a display W (pixel) are for designating the area where the additional data are displayed. FIG. 4 shows an example of a display of the first contents in which the additional data are embedded. In this example, the additional data display area 22 is generated at a location within the data display area 21 designated by Y, X, H and W. The data display area 21 is an area for displaying an image that was transmitted from the relay device 1 in the communication terminal 2.

The attribution table 142 is for accumulating the relationship between the method of adding the additional data and the attribution value. Here, as an example as shown in FIG. 5, the attribution value "00" and the content "no addition", the attribution value "01" and the content "character string insertion", the attribution value "02" and the content "static image insertion", and the attribution value "03" and the content "static image insertion" are associated with each other, respectively. The "content" indicates which process the relay device 1 performs on the first contents transmitted from the communication terminal 2. Here, the "no addition" means that no process is performed on the first contents. The "character string insertion" means that a character string is inserted in the first contents. The "static image insertion" means that a static image is inserted in the first contents. The "moving image insertion" means that a moving image is inserted in the first contents. The character string, the static image and the moving image to be inserted are accumulated in the database for addition 16 of the relay device 1. Furthermore, although not shown in FIG. 5, it is possible to accumulate a content indicating a process except for adding the additional data or a program for performing the process, e.g., "lost packet compensation" or "contrast adjustment" in the "content" field.

Figure 6:
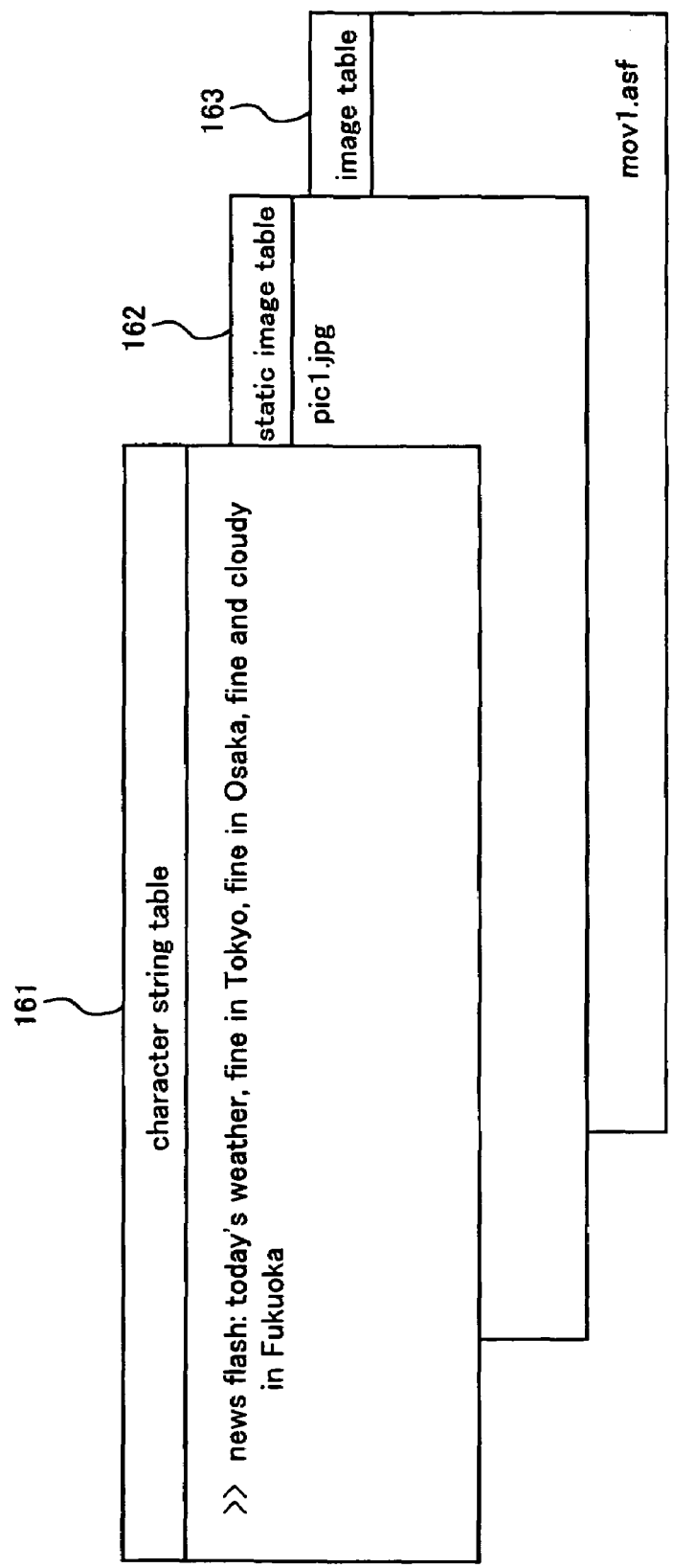
FIG. 6 is a conceptual explanatory diagram of information to be accumulated in a character string table, a static image table and moving image table of an additional database.

The database for addition 16 is for accumulating the additional data. In this example, the database for addition 16 includes a character string table 161, a static image table 162 and a moving image table 163. FIG. 6 is a conceptual explanatory diagram of information to be accumulated in the character string table 161, the static image table 162 and the moving image table 163. The character string table 161 is for accumulating the character string to be combined with the first contents. The static image table 162 is for accumulating the identifier of the static image to be combined with the first contents. The static image table 162 may be used for accumulating the static image file itself. The static image table 162 is for accumulating the identifier of the moving image to be combined with the first contents. The static image table 162 may be used for accumulating the moving image file itself.

(2) Process Flow

Hereinafter, a flow of a process in the entire communication system will be explained with reference to FIG. 7. In this example, a case will be explained where the relay device 1 adds the stored additional data to the received contents. In this communication system, the communication terminal 2a makes a call to the communication terminal 2b by SIP (Session Initiation Protocol) or other protocols so that the connection is established between them (#1-#12). When the connection between the communication terminal 2a and the communication terminal 2b is established, the second contents obtained by adding the additional data to the first contents containing video data such as a moving image or a static image of a speech communicator for example are transmitted from the relay device 1a to the communication terminal 2b via the relay device 1b (#13-#18).

Figures 8, 9:
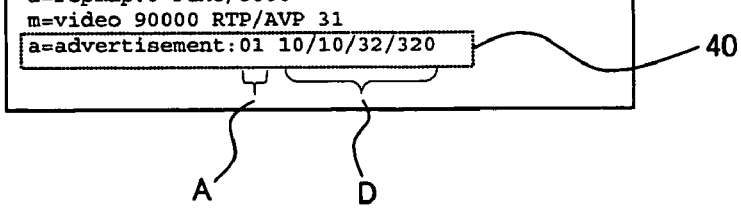
FIG. 8 shows an example of a first INVITE message.
FIG. 9 shows an example of a second INVITE message and a designation header contained in the message.

The call is performed as follows. The communication terminal 2a transmits a first INVITE message to the relay device 1a (#1). The first INVITE message contains contents as shown in FIG. 8 for example, which indicates that it is a cell from the communication terminal 2a to the communication terminal 2b. The relay device 1a adds a designation header 40 to the INVITE message for transmitting the same to the relay device 1b and generates a second INVITE message (#2). FIG. 9 shows an example of a second INVITE message. The relay device 1a transmits a second INVITE message with the added designation header to the relay device 1b (#3). The second INVITE message indicates that it is a call from the communication terminal 2a to the communication terminal 2b via the relay device 1a. In addition, the designation header 40 indicates that the additional data are added to the first contents after establishing the connection. In other words, the designation header 40 indicates that the relay device 1a has a function of adding the additional data. The designation header 40 includes an attribution value A and output control data D. For example, the designation header 40 as shown in FIG. 9 includes the attribution value "01" and the additional data display area value "10/10/32/320". The attribution value A is a value for deciding whether or not the additional data is added and for designating a type of the additional data. One of the attribution values accumulated in the attribution table 142 is described as the attribution value A. The output control data D designates how the additional data are embedded in the first contents. In this example, the output control data are generated in accordance with the control information table 141 of the relay device 1. Of course, it is possible to constitute so that the attribution value A and the output control data D can be set by an operator of the relay device 1. In the example as shown in FIG. 9, the output control data designates the height of the start point (Y), the width of the start point X, the height of the display H, the width of the display W and the display area of the additional data.

The relay device 1b decides whether or not the second INVITE message contains the designation header (#4). If it is contained, the designation header 40 is removed from the second INVITE message so that the third INVITE message is generated (#5). The relay device 1b transmits a third INVITE message to the communication terminal 2b (#6). The third INVITE message contains the contents as shown in FIG. 10 for example, which indicates that it is a call from the communication terminal 2a to the communication terminal 2b via the relay device 1a and the relay device 1b. When receiving the third INVITE message normally, the communication terminal 2b transmits an OK message indicating the reception to the communication terminal 2a via the relay device 1a and the relay device 1b (#7, #8 and #9). When receiving the OK message normally, the communication terminal 2a transmits an ACK message that indicates that the connection has been established to the communication terminal 2b via the relay devices 1a and 1b (#10, #11 and #12). In this way, the call from the communication terminal 2a to the communication terminal 2b is formed, and the communication between the communication terminal 2a and the communication terminal 2b can be performed.

When the call between the communication terminal 2a and the communication terminal 2b is established, the bidirectional communication is started between the communication terminal 2a and the communication terminal 2b. In order to simplify the description, it is assumed that the moving image data are transmitted from the communication terminal 2a to the communication terminal 2b. First, a part of the first contents (hereinafter simply referred to as first contents) is transmitted from the communication terminal 2a to the relay device 1a (#13).

The adder-subtracter portion 15 of the relay device 1a adds first additional data to the first contents in accordance with the instruction of the relay control portion 13 so as to generate the second contents (#14). A type of the added data and a method of embedding the additional data are based on the designation header 40 of the second INVITE message. For example, the relay control portion 13 of the relay device 1a instructs the adder-subtracter portion 15 to combine the first contents with the text data accumulated in the database for addition 16 as the additional data in accordance with the attribution table 142 and the attribution value "01" that is indicated in the designation header 40 as shown in FIG. 9. The adder-subtracter portion 15 adds the text data to the first contents in accordance with the instruction of the relay control portion 13. The method of adding the additional data is as follows in the case where the first contents are a moving image and the additional data are text data. The text data are embedded in the first contents so that a character string is displayed with being scrolled at the speed V (pixels/sec) in the position on the data display portion 21 designated by Y, X, H and W (pixels) accumulated in the control information table 141 (see FIG. 4), for example. Then, the relay device 1a transmits the second contents to the relay device 1b (#15).

The relay control portion 13 of the relay device 1b that received the second contents containing the first contents and the first additional data recognizes that the first additional data is contained in the second contents in accordance with the designation header of the second INVITE message. Accordingly, e.g., the relay control portion 13 of the relay device 1b can instruct the adder-subtracter portion 15 to delete the first additional data from the second contents (#16). In this way, the first contents that are the original moving image data are reconstructed.

Next, the relay control portion 13 instructs the adder-subtracter portion 15 to add the second additional data stored in the database for addition 16 thereof to the first contents, so as to generate third contents (#17). The output control data for designating a type of the second additional data and a method of embedding the same can be determined in accordance with the designation header 40 in the second INVITE message from the relay device 2a, for example. In addition, it is possible to decide which additional data are added and how the second additional data are embedded in accordance with the data of the control information DB 14 stored in the relay device 2b. After that, the relay device 1b transmits the generated third contents to the communication terminal 2b (#18).

The process explained above can be also applied to the case where the communication terminal 2b transmits data to the communication terminal 2a. In this case, roles of the relay devices 1a and 1b are exchanged. In addition, the relay device 1 can have both functions of relay devices 1a and 1b. Since this relay device 1 generates new contents by adding additional data such as an advertisement to contents and transmits the new contents as a payload, the additional data can be delivered in a terminal at the reception side without depending on a communication application of the terminal at the reception side. In addition, if it is not desired to deliver the additional data in the terminal at the reception side, the additional data can be erased by the relay device 1. Furthermore, it is prevented that the additional data are added to the original contents in an overlapping manner.

Second Embodiment

Figure 7:
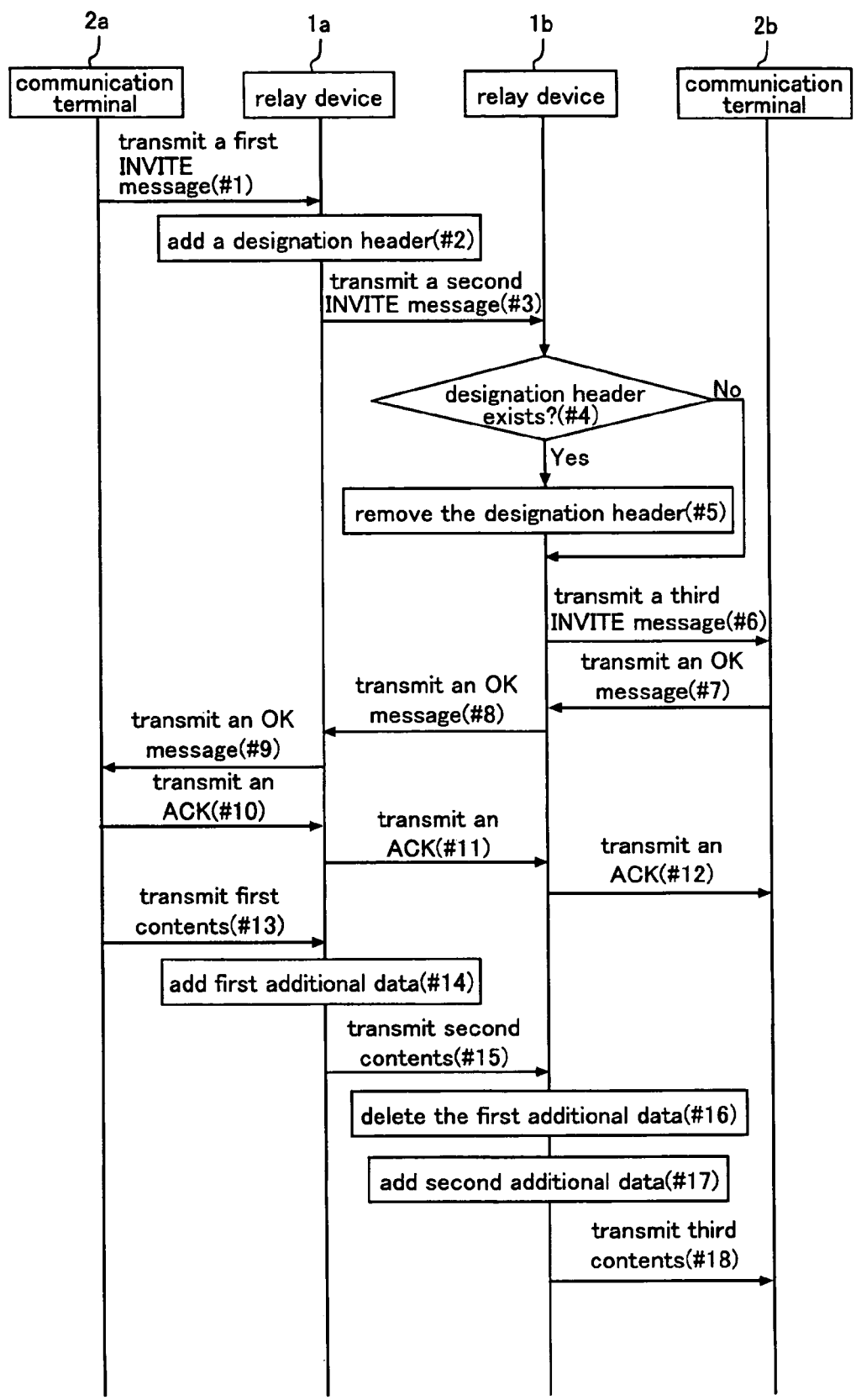
FIG. 7 is a flowchart of a process in the entire communication system according to the first embodiment.

In the first embodiment as shown in FIG. 7, the case is explained where the second additional data stored in the relay device 1b are added to the contents received by the relay device 1b. However, it is possible that the relay device 1b does not add the second additional data when deciding that the party on the other end of the original communication is the relay device 1a having the same function as itself at the stage that the call is established. This decision is performed at the stage that the call is established by deciding where or not the second INVITE message contains the designation header (the above-mentioned Step #4).

Figure 11:
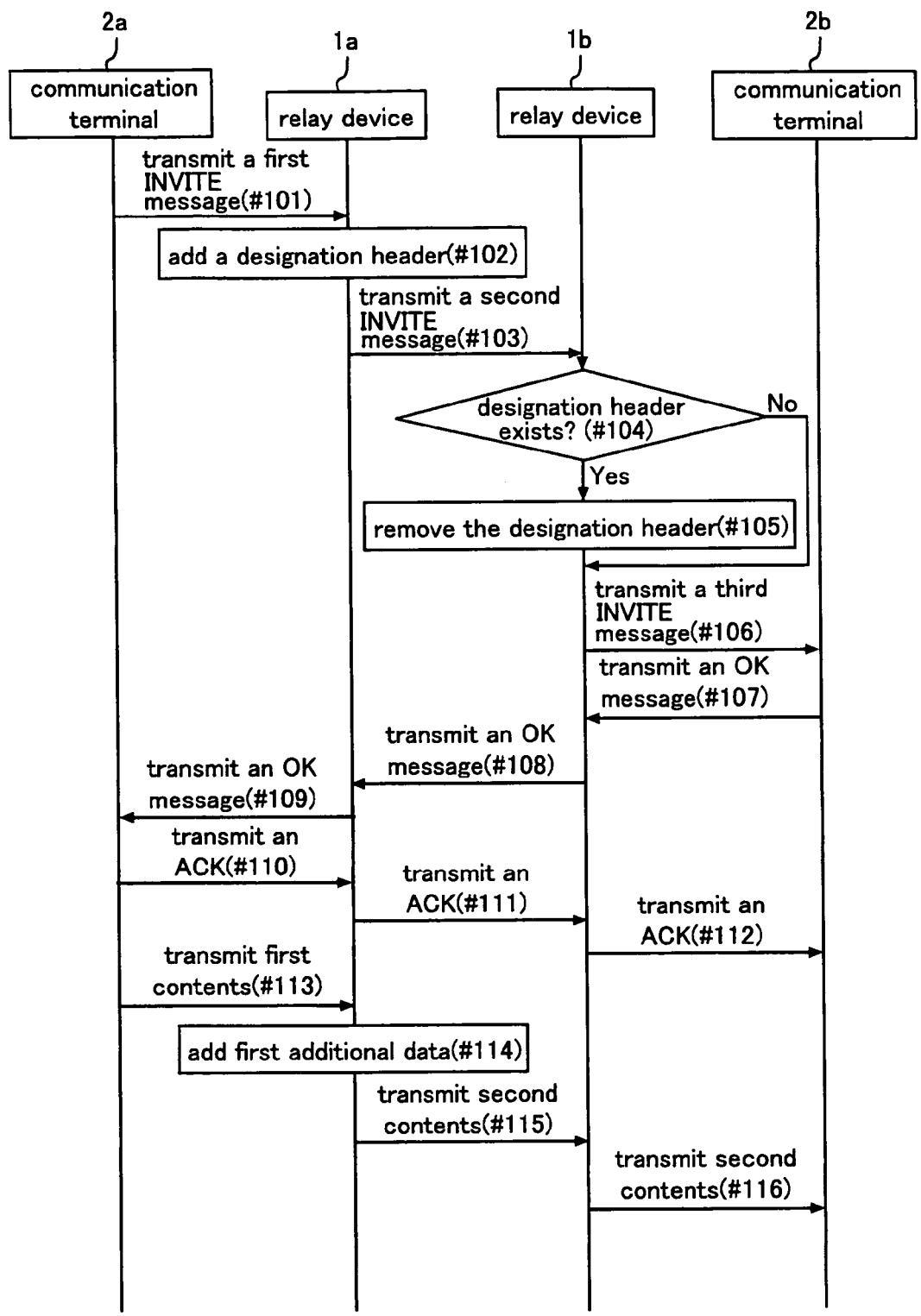
FIG. 11 is a flowchart of a process in the entire communication system according to a second embodiment.

The process flow of the communication system in this case will be explained with reference to FIG. 11. In FIG. 11, Steps #101-#115 are performed in the same manner as the Steps #1-#15 explained above. When it is decided that the first additional data are added to the first contents in Step #104, the relay device 1b transmits the received second contents to the communication terminal 2b in Step #116. In this way, it is avoided that the relay device 1b adds the second additional data in an overlapping manner to the first contents to which the first additional data are already added by the relay device 1a.

Third Embodiment

In the above-explained first embodiment as shown in FIG. 7, the case is explained where if the second contents received by the relay device 1b contains the first additional data added by the other relay device 1a, the relay device 1b erases the first additional data and then adds the second additional data stored in itself. However, the relay device 1 can further add the second additional data to the second contents that contain the first additional data.

Figure 12:
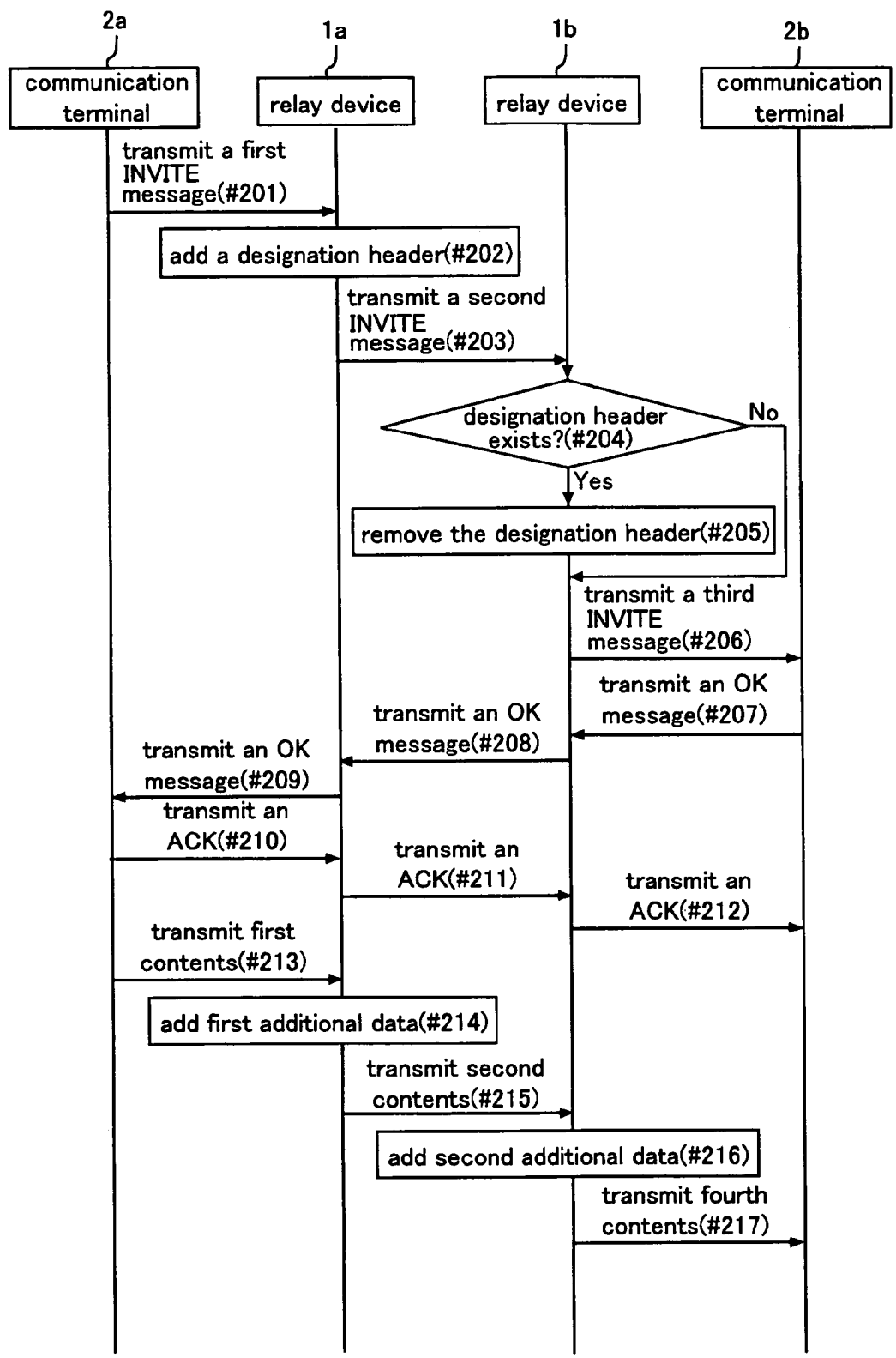
FIG. 12 is a flowchart of a process in the entire communication system according to a third embodiment.

The process flow of the communication system in this case will be explained with reference to FIG. 12. In FIG. 12, Steps #201-#215 are performed in the same way as Step #1-#15 explained above. In Step #216, the relay control portion 13 instructs the adder-subtracter portion 15 to add the second additional data stored in the database for addition 16 of itself to the second contents so as to generate fourth contents (#216). After that, the relay device 1b transmits the generated fourth contents to the communication terminal 2b (#217).

In this way, the relay device 1 can add the additional data to the first contents in a superimposing manner.

Other Embodiments (A) The first contents of the first embodiment explained above can be data except for an image. For example, they can be speech communication audio data. Furthermore, the additional data of the first embodiment can be data except for a character string. For example, they can be a static image, a moving image or audio data. If the first contents are a moving image and the additional data are a static image for example, the adder-subtracter portion 15 produces bitmapped data (RGB data) of the static image with the first contents as a background by picture in picture. It is possible to produce the first contents with the bitmapped data of the static image as a background by picture in picture. Alternatively, if the first contents and the additional data are moving images, the adder-subtracter portion 15 combines the additional data that are bitmapped data (RGB data) of continuous static images constituting a moving image with the first contents continuously. Alternatively, if the first contents and the additional data are audio data, the adder-subtracter portion 15 mixes the first contents with the additional data.

(B) The relay device 1a or the relay device 1b in the first embodiment explained above may perform a process for compensating quality deterioration of the first contents, the first additional data, the second contents, the second additional data and the third contents, a process for compensating a packet loss, a process for adjusting a contrast of an image and a process for adjusting a gain of the audio data. In addition, information indicating whether or not to perform the above-mentioned processes may be accumulated in the control information DB 14, and the above-mentioned processes may be performed in accordance with the information.

(C) In the first embodiment explained above, the relay device 1 adds the additional data stored in itself to the contents. However, it is possible that relay device 1 obtains a resource existing in the other relay device 1 or on the network 3 and adds it as the additional data to the contents.

(D) It is possible that a user of the relay device 1 of the first embodiment explained above may adds the additional data such as a character string, an image or a sound indicating an advertisement of a product or a service to the first contents, so as to collect an advertisement fee from a person who asked the advertisement. In addition, it is possible that when a person uses the communication terminal 2 for receiving the second contents with an advertisement and purchasing a product or a service indicated by the advertisement contained in the second contents via a well-known electronic commerce, the person can be given a discount of a communication fee of the communication terminal 2 via the relay device 1 or a price of the product. Here, the product or the service indicated by the advertisement that is added to the first contents can be distinguished by inserting a key in the additional data for discriminating the product or the service. In this way, a profit may circulate among the user of the relay device 1, a person who asks the advertisement and the user of the communication terminal 2*b*.

(E) The recording medium storing the program for performing the method of the present invention explained above is included in the scope of the present invention. Here, the recording medium can be a flexible disk, a hard disk, a semiconductor memory, a CD-ROM, a DVD, a MO and other media that can be read and written by a computer.

According to the present invention, since the data obtained by adding additional data to contents are transmitted as new contents, it is possible to add data without depending on a communication application of a computer that is a destination.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A communication relay method performed by a relay device that relays communication between two computers, the method comprising:
   receiving a request information for establishing a connection with the two computers, the request information including instruction information relating to contents being received and/or sent after establishing the connection;
   adding a designation header to the request information;
   transmitting the request information including the designation header to a relay computer;
   controlling, based on the designation header, whether the relay computer adds first additional data to first contents and establishing the connection with the two computers via the relay computer;
   transmitting the first contents between the two computers after establishing the connection;
   receiving the first contents transmitted from a sender among the two computers to a destination of the first contents as a payload;
   accumulating the first additional data to be added to the first contents;
   determining, based on the designation header sent to the relay computer, a procedure for adding the first additional data to the first contents;
   transmitting second contents containing the first contents and the first additional data as a payload to the destination based on a result of the determining; and
   wherein the first contents to be received in the receiving contain image data and/or audio data.

2. The method according to claim 1, further comprising:
   combining the first contents with the first additional data so as to generate the second contents if each of the first contents and the first additional data contain image data and/or text data.

3. The method according to claim 2, wherein the accumulating includes further accumulation of output control data for designating a display area of the first additional data, and the combining includes combining the first contents with the first additional data in accordance with the output control data.

4. The method according to claim 2, wherein the accumulating includes further accumulation of output control data for designating a speed of scrolling the first additional data if the first additional data contain text data, and the combining includes combining the first contents with the first additional data in accordance with the output control data.

5. The method according to claim 2, wherein the accumulating includes further accumulation of output control data for designating an output frequency of the first additional data if the first additional data contain moving image data, and the combining includes combining the first contents with the first additional data in accordance with the output control data.

6. The method according to claim 1, further comprising the of mixing the first contents with the first additional data so as to generate mixing data if each of the first contents and the first additional data contain audio data, wherein the transmitting includes transmitting the mixing data.

7. The method according to claim 6, wherein the accumulating includes further accumulation of output control data for designating an output sound level of the first additional data, and the mixing includes mixing the first contents with the first additional data in accordance with the output control data.

8. The method according to claim 1, further comprising:
   adjusting quality of image data and/or audio data contained in the first contents, wherein the transmitting includes transmitting the first additional data and first contents after adjusted in the quality adjusting.

9. A communication relay device for relaying communication between two computers, comprising:
   a unit for receiving a request information for establishing a connection with the two computers, the request information including instruction information relating to contents being received and/or sent after establishing the connection;
   a unit for adding a designation header to the request information;
   a unit for transmitting the request information including the designation header to a relay computer;
   a unit for controlling, based on the designation header, whether the relay computer adds first additional data to first contents and establishing the connection with the two computers via the relay computer, the first contents being transmitted between the two computers after establishing the connection;
   a unit for receiving the first contents transmitted from a sender among the two computers to a destination of the first contents as a payload;
   a unit for accumulating the first additional data to be added to the first contents;
   a determiner for determining, based on the designation header sent to the relay computer, a procedure for adding the first additional data to the first contents;
   a unit for transmitting second contents containing the first contents and the first additional data as a payload to the destination based on a result of the determining, and
   wherein the first contents to be received by the receiving unit contain image data and/or audio data.

10. A computer readable storage medium having a program for causing a first relay device to execute operations including relaying communication between two computers, comprising:

receiving an establishing request information for establishing a connection with the two computers, the establishing request information including instruction information and the instruction information being related to contents being received and/or sent after establishing the connection;

judging, based on the instruction information, whether first additional data is to be added to first contents and establishing the connection with the two computers;

receiving second contents containing the first contents transmitted from one of the two computers and the first additional data added to the first contents by a second relay device as a payload, a procedure for adding the first additional data to the first contents being determined based on the instruction information;

accumulating second additional data to be added to the first contents;

reconstructing the first contents by removing the first additional data from the second contents based on the instruction information included in the received establishing request information; and transmitting third contents containing the first contents obtained in the reconstructing and the second additional data as a payload to the computer that is a destination of the first contents based on a result of determining based on the instruction information; and wherein the first contents is retrieved by removing the first additional data.

11. A computer-readable recording medium storing a communication relay program that is executed by a relay device for relaying communication between two computers, the program functionalizing the relay device as a unit for receiving a request information to establish a connection with the two computers, the request information including instruction information relating to contents being received and/or sent after establishing the connection;

a unit for adding a designation header to the request information and transmitting the request information including the designation header to a relay computer;

a unit for controlling, based on the designation header, whether the relay computer adds first additional data to first contents and establishing the connection with the two computers via the relay computer, the first contents being transmitted between the two computers after establishing the connection;

a unit for receiving the first contents transmitted from a sender of the two computers to a destination of the first contents as a payload;

a unit for accumulating the first additional data to be added to the first contents;

a determiner for determining, based on the designation header sent to the relay computer, a procedure for adding the first additional data to the first contents; and a unit for transmitting second contents containing the first contents and the first additional data as a payload to the destination based on the a result of the determining, and wherein the first contents to be received by the receiving unit contain image data and/or audio data.

12. A communication relay method performed by a first relay device that relays communication between two computers, the method comprising:

establishing a connection with the two computers by receiving an establishing request information, the establishing request information including instruction information and the instruction information being related to contents being received and/or sent after establishing the connection;

receiving second contents containing first contents transmitted from one of the two computers and first additional data added to the first contents by a second relay device as a payload;

accumulating second additional data to be added to the first contents;

reconstructing the first contents by removing the first additional data from the second contents based on the instruction information included in the received establishing request information; and transmitting third contents containing the first contents obtained in the reconstructing and the second additional data as a payload to the computer that is a destination of the first contents based on the instruction information included in the received establishing request information, wherein the first contents is retrieved by removing the first additional data.

13. A communication relay method performed by a first relay device that relays communication between two computers, the method comprising:

establishing a connection with the two computers;

receiving first contents transmitted from one of the two computers as a payload;

accumulating first additional data to be added to the first contents;

deciding whether or not second additional data that was added to the first contents by a second relay device except the first relay device are contained in reception data; and transmitting third contents containing the first contents and the second additional data as a payload to the computer that is a destination of the first contents if the reception data contain the second additional data, while transmitting second contents containing the first contents and the first additional data as a payload to the computer that is a destination of the first contents if the reception data does not contain the second additional data, wherein the first contents to be received in the receiving contain image data and/or audio data.

* * * * *

UNITED STATES PATENT AND TRADEMARK OFFICE
CERTIFICATE OF CORRECTION

PATENT NO. : 7,702,804 B2  Page 1 of 1
APPLICATION NO. : 10/737803
DATED : April 20, 2010
INVENTOR(S) : Masanobu Morinaga et al.

It is certified that error appears in the above-identified patent and that said Letters Patent is hereby corrected as shown below:

Column 12, Lines 23-34, change "comprising the of" to --comprising--

Column 14, Line 3, change "based on the a" to --based on the--

Signed and Sealed this

Third Day of August, 2010

David J. Kappos
*Director of the United States Patent and Trademark Office*